(12) United States Patent
Tan et al.

(10) Patent No.: US 9,117,087 B2
(45) Date of Patent: Aug. 25, 2015

(54) SYSTEM AND METHOD FOR CREATING A SECURE CHANNEL FOR INTER-APPLICATION COMMUNICATION BASED ON INTENTS

(71) Applicant: Box, Inc., Los Altos, CA (US)

(72) Inventors: Simon Tan, Daly City, CA (US); David Maynard, Menlo Park, CA (US); Rico Yao, San Jose, CA (US); Don Cung, Palo Alto, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/776,535

(22) Filed: Feb. 25, 2013

(65) Prior Publication Data

US 2014/0068779 A1    Mar. 6, 2014

Related U.S. Application Data

(60) Provisional application No. 61/697,511, filed on Sep. 6, 2012.

(51) Int. Cl.
| | |
|---|---|
| G06F 21/00 | (2013.01) |
| G06F 21/60 | (2013.01) |
| G06F 9/54 | (2006.01) |
| H04L 9/00 | (2006.01) |
| G06F 17/24 | (2006.01) |

(52) U.S. Cl.
CPC .............. *G06F 21/606* (2013.01); *G06F 9/544* (2013.01); *G06F 17/24* (2013.01); *H04L 9/00* (2013.01)

(58) Field of Classification Search
CPC ............ H04L 9/00; G06F 9/544; G06F 17/24

USPC .......................................................... 726/26
See application file for complete search history.

(56) References Cited

U.S. PATENT DOCUMENTS

| | | |
|---|---|---|
| 5,043,876 A | 8/1991 | Terry |
| 5,748,735 A | 5/1998 | Ganesan |

(Continued)

FOREIGN PATENT DOCUMENTS

| | | |
|---|---|---|
| CA | 2724521 A1 | 11/2009 |
| CN | 101997924 A | 3/2011 |

(Continued)

OTHER PUBLICATIONS

Burns, "Developing Secure Mobile Applications for Android", Oct. 2008, Version 1.0, pp. 1-28.*

(Continued)

*Primary Examiner* — David Pearson
*Assistant Examiner* — Thaddeus Plecha
(74) *Attorney, Agent, or Firm* — Perkins Coie LLP

(57) ABSTRACT

System and method for creating a secure channel for inter-application communication based on the messaging system called Intents in the Android OS are disclosed. In one embodiment, an application for accessing a cloud-based storage platform triggers the broadcast of a custom Intent to all applications on a mobile device to detect an authorized application that is capable of interacting with the application. Once an authorized application is chosen, the application opens a secure channel for communication with the authorized application and passes encrypted data stream to the to the secure channel for access by the authorized application.

17 Claims, 9 Drawing Sheets

(56) References Cited

U.S. PATENT DOCUMENTS

| | | |
|---|---|---|
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,745,267 B2 | 6/2014 | Luecke et al. |
| 8,782,637 B2 | 7/2014 | Khalid |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 * | 2/2015 | Barton et al. ............... 726/1 |
| 8,966,062 B1 | 2/2015 | Giese et al. |
| 8,990,955 B2 | 3/2015 | Hymel et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |

(56) References Cited

U.S. PATENT DOCUMENTS

| | | | |
|---|---|---|---|
| 2004/0201604 A1 | 10/2004 | Kraenzel et al. | |
| 2004/0218214 A1 | 11/2004 | Kihara et al. | |
| 2004/0230624 A1 | 11/2004 | Frolund et al. | |
| 2004/0246532 A1 | 12/2004 | Inada | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0022229 A1 | 1/2005 | Gabriel et al. | |
| 2005/0028006 A1 | 2/2005 | Leser et al. | |
| 2005/0038997 A1 | 2/2005 | Kojima et al. | |
| 2005/0050228 A1 | 3/2005 | Perham et al. | |
| 2005/0055306 A1 | 3/2005 | Miller et al. | |
| 2005/0063083 A1 | 3/2005 | Dart et al. | |
| 2005/0097225 A1 | 5/2005 | Glatt et al. | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0182966 A1* | 8/2005 | Pham et al. | 713/201 |
| 2005/0198299 A1 | 9/2005 | Beck et al. | |
| 2005/0198452 A1 | 9/2005 | Watanabe | |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0005163 A1 | 1/2006 | Huesken et al. | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0041752 A1 | 2/2006 | Tuvell et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0117247 A1 | 6/2006 | Fite et al. | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0179309 A1 | 8/2006 | Cross et al. | |
| 2006/0242204 A1 | 10/2006 | Karas et al. | |
| 2006/0242206 A1 | 10/2006 | Brezak et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2006/0288043 A1 | 12/2006 | Novak et al. | |
| 2007/0016680 A1 | 1/2007 | Burd et al. | |
| 2007/0038934 A1 | 2/2007 | Fellman | |
| 2007/0067349 A1 | 3/2007 | Jhaveri et al. | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |
| 2007/0118598 A1 | 5/2007 | Bedi et al. | |
| 2007/0124460 A1 | 5/2007 | McMullen et al. | |
| 2007/0124737 A1 | 5/2007 | Wensley et al. | |
| 2007/0124781 A1 | 5/2007 | Casey et al. | |
| 2007/0126635 A1 | 6/2007 | Houri | |
| 2007/0130143 A1 | 6/2007 | Zhang et al. | |
| 2007/0130163 A1 | 6/2007 | Perez et al. | |
| 2007/0162610 A1 | 7/2007 | Un et al. | |
| 2007/0198609 A1 | 8/2007 | Black et al. | |
| 2007/0208878 A1 | 9/2007 | Barnes-Leon et al. | |
| 2007/0214180 A1 | 9/2007 | Crawford | |
| 2007/0220016 A1 | 9/2007 | Estrada et al. | |
| 2007/0220590 A1 | 9/2007 | Rasmussen et al. | |
| 2007/0240057 A1 | 10/2007 | Satterfield et al. | |
| 2007/0250762 A1 | 10/2007 | Mansfield | |
| 2007/0256065 A1 | 11/2007 | Heishi et al. | |
| 2007/0266304 A1 | 11/2007 | Fletcher et al. | |
| 2007/0282848 A1 | 12/2007 | Kiilerich et al. | |
| 2007/0283443 A1 | 12/2007 | McPherson et al. | |
| 2007/0288290 A1 | 12/2007 | Motoyama et al. | |
| 2008/0005135 A1 | 1/2008 | Muthukrishnan et al. | |
| 2008/0005195 A1 | 1/2008 | Li | |
| 2008/0016146 A1 | 1/2008 | Gan et al. | |
| 2008/0021959 A1 | 1/2008 | Naghi et al. | |
| 2008/0028323 A1 | 1/2008 | Rosen et al. | |
| 2008/0040173 A1 | 2/2008 | Aleong et al. | |
| 2008/0046828 A1 | 2/2008 | Bibliowicz et al. | |
| 2008/0059656 A1 | 3/2008 | Saliba et al. | |
| 2008/0063210 A1 | 3/2008 | Goodman et al. | |
| 2008/0065881 A1 | 3/2008 | Dawson et al. | |
| 2008/0077631 A1 | 3/2008 | Petri | |
| 2008/0091763 A1 | 4/2008 | Devonshire et al. | |
| 2008/0091790 A1 | 4/2008 | Beck | |
| 2008/0104277 A1 | 5/2008 | Tian | |
| 2008/0114720 A1 | 5/2008 | Smith et al. | |
| 2008/0133674 A1 | 6/2008 | Knauerhase et al. | |
| 2008/0140732 A1 | 6/2008 | Wilson et al. | |
| 2008/0147790 A1 | 6/2008 | Malaney et al. | |
| 2008/0151817 A1 | 6/2008 | Fitchett et al. | |
| 2008/0154873 A1 | 6/2008 | Redlich et al. | |
| 2008/0182628 A1 | 7/2008 | Lee et al. | |
| 2008/0183467 A1 | 7/2008 | Yuan et al. | |
| 2008/0184130 A1 | 7/2008 | Tien et al. | |
| 2008/0194239 A1 | 8/2008 | Hagan | |
| 2008/0215883 A1* | 9/2008 | Fok et al. | 713/167 |
| 2008/0222654 A1 | 9/2008 | Xu et al. | |
| 2008/0243855 A1 | 10/2008 | Prahlad et al. | |
| 2008/0250333 A1 | 10/2008 | Reeves et al. | |
| 2008/0250348 A1 | 10/2008 | Alimpich et al. | |
| 2008/0263099 A1 | 10/2008 | Brady-Kalnay et al. | |
| 2008/0271095 A1 | 10/2008 | Shafton | |
| 2008/0276158 A1 | 11/2008 | Lim et al. | |
| 2008/0294899 A1 | 11/2008 | Gazzetta et al. | |
| 2009/0015864 A1 | 1/2009 | Hasegawa | |
| 2009/0019093 A1 | 1/2009 | Brodersen et al. | |
| 2009/0019426 A1 | 1/2009 | Baeumer et al. | |
| 2009/0030710 A1 | 1/2009 | Levine | |
| 2009/0043848 A1 | 2/2009 | Kordun | |
| 2009/0044128 A1 | 2/2009 | Baumgarten et al. | |
| 2009/0049131 A1 | 2/2009 | Lyle et al. | |
| 2009/0119322 A1 | 5/2009 | Mills et al. | |
| 2009/0125469 A1 | 5/2009 | McDonald et al. | |
| 2009/0132651 A1 | 5/2009 | Roger et al. | |
| 2009/0138808 A1 | 5/2009 | Moromisato et al. | |
| 2009/0150417 A1 | 6/2009 | Ghods et al. | |
| 2009/0150627 A1 | 6/2009 | Benhase et al. | |
| 2009/0158142 A1 | 6/2009 | Arthursson et al. | |
| 2009/0164438 A1 | 6/2009 | Delacruz | |
| 2009/0171983 A1 | 7/2009 | Samji et al. | |
| 2009/0177754 A1 | 7/2009 | Brezina et al. | |
| 2009/0193107 A1 | 7/2009 | Srinivasan et al. | |
| 2009/0193345 A1 | 7/2009 | Wensley et al. | |
| 2009/0198772 A1 | 8/2009 | Kim et al. | |
| 2009/0210459 A1 | 8/2009 | Nair et al. | |
| 2009/0214115 A1 | 8/2009 | Kimura et al. | |
| 2009/0235167 A1 | 9/2009 | Boyer et al. | |
| 2009/0235181 A1 | 9/2009 | Saliba et al. | |
| 2009/0235189 A1 | 9/2009 | Aybes et al. | |
| 2009/0249224 A1 | 10/2009 | Davis et al. | |
| 2009/0254589 A1 | 10/2009 | Nair et al. | |
| 2009/0260060 A1 | 10/2009 | Smith et al. | |
| 2009/0265430 A1 | 10/2009 | Bechtel et al. | |
| 2009/0271708 A1 | 10/2009 | Peters et al. | |
| 2009/0276771 A1 | 11/2009 | Nickolov et al. | |
| 2009/0282212 A1 | 11/2009 | Peterson | |
| 2009/0282483 A1 | 11/2009 | Bennett | |
| 2009/0300356 A1 | 12/2009 | Crandell | |
| 2009/0300527 A1 | 12/2009 | Malcolm et al. | |
| 2009/0327358 A1 | 12/2009 | Lukiyanov et al. | |
| 2009/0327405 A1 | 12/2009 | Fitzgerald et al. | |
| 2009/0327961 A1 | 12/2009 | De Vorchik et al. | |
| 2010/0011292 A1 | 1/2010 | Marinkovich et al. | |
| 2010/0011447 A1 | 1/2010 | Jothimani | |
| 2010/0017262 A1 | 1/2010 | Iyer et al. | |
| 2010/0017619 A1 | 1/2010 | Errico | |
| 2010/0036929 A1 | 2/2010 | Scherpa et al. | |
| 2010/0042720 A1 | 2/2010 | Stienhans et al. | |
| 2010/0057560 A1 | 3/2010 | Skudlark et al. | |
| 2010/0057785 A1 | 3/2010 | Khosravy et al. | |

(56) References Cited

U.S. PATENT DOCUMENTS

| | | |
|---|---|---|
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |

(56) References Cited

U.S. PATENT DOCUMENTS

| | | |
|---|---|---|
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1* | 12/2012 | Mulder et al. ............ 709/219 |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Burney, "How to Move Documents From Your Computer to Your iPad and Back Again", May 31, 2011, 3 pages.*
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.

(56) References Cited

OTHER PUBLICATIONS

Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Palmer, "Load Balancing FTP Servers," BlogNav, Oct. 2008, 2 pages.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1312264.3, Applicant: Box, Inc. Mailed Mar. 24, 2014, 7 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.

(56) References Cited

OTHER PUBLICATIONS

Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1316532.9 Applicant: Box, Inc. Mailed Mar. 27, 2015, 6 pages.
"Dropbox: Sync only specific folders," posted on Feb. 9, 2012, available online at http://www.tech-recipes.comft/20865/dropbox-sync-only-specific-folders/, 4 pages.
No Stated Author, Amazon Simple Storage Services FAQs, 2012, https://web.archive.org.web/20120615092600/http://aws.amazon.com/s3/faqs/>; pp. 1-14.
Mogull, "DLP Content Discovery: Best Practices for Stored Data Discovery and Protection," 2009, pp. 1-16.
No Stated Author, "CheckPoint Virtual Appliance for Amazon Web Services," 2012, pp. 1-6.
Invens, "Using and Troubleshooting Offline Files," Jun. 23, 2002, Windows IT Pro, Figures 1 and 2, 2 pages.

* cited by examiner

SYSTEM AND METHOD FOR CREATING A SECURE CHANNEL FOR INTER-APPLICATION COMMUNICATION BASED ON INTENTS

CROSS-REFERENCE TO RELATED APPLICATION

The present application claims priority to and benefit from U.S. Provisional Patent Application Ser. No. 61/697,511 titled "Channel For Opening And Editing Files From A Cloud Service Provider Based on Intents", filed on Sep. 6, 2012, the content of which is incorporated by reference herein.

BACKGROUND

The Android operating system ("Android OS") relies on a rich inter-application messaging system called "Intents" for communication between applications. The messaging system promotes collaboration between applications by allowing applications to leverage existing data or services from each other. For example, a restaurant directory application can ask one application to launch the a restaurant website, another application to call a restaurant, another application to display directions to a restaurant, and so on.

The Intents based messaging system can, however, be vulnerable to attack. Messages being passed via Intents can be sniffed, stolen or modified by malicious applications, which can lead to loss of user privacy and data breach. One way in which the security of applications running on the Android OS can be maintained is by creating a sandbox or a container, where an application can run securely without any data leaks. However, for applications that generally handle transfer of a limited number of files or pieces of data, the sandbox solution is excessively broad, heavy-handed and more complex than necessary.

DETAILED DESCRIPTION

Figure 1:
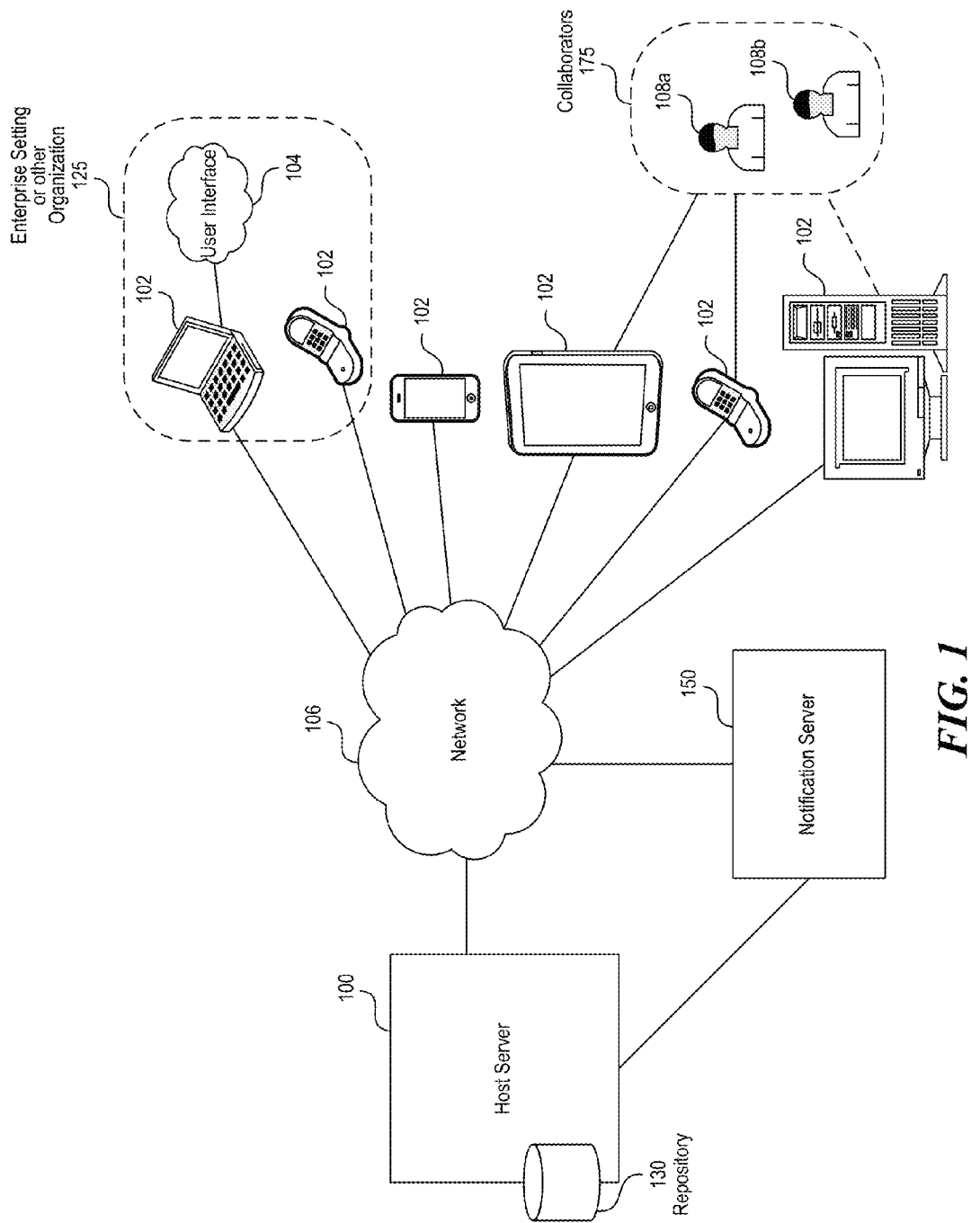
FIG. 1 illustrates an example diagram of a system having a host server of a cloud service and/or cloud storage accounts accessible via a mobile application facilitating inter-application communication over a secure channel based on Intents.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include system and method for creating a secure channel for inter-application communication based on a communication mechanism called "Intent." In one implementation, the secure inter-application communication system and method allows opening and editing of files from a cloud-based service provider based on Intents.

In the Android operating system (hereinafter "OS"), the Intent mechanism is leveraged by applications to pass data between each other. Unfortunately, when an application issues an Intent using the default system, all applications on the system can detect it and all applications have access to the data being passed. In one embodiment, the secure inter-application communication system and method disclosed herein secures the inter-application communication by issuing the Intent in two phases. First, an Intent to detect which applications are capable of interacting with the mobile client application accessing the server such as a server hosting a cloud-based platform or service or other backend web services. Then, once an application is chosen, the mobile client application opens a secure channel only to that application and passes data in encrypted form to it. The targeting phase is deliberate so that only the application which is chosen can receive the data. In addition, the file can be sent as a data stream instead of a whole file all at once for further obfuscation.

In one embodiment, the mobile application can create an area on the mobile device's storage as a "staging area" for content to be passed between applications, and the files that go into this area are always to be securely encrypted. The staging area is effectively the channel between the applications. This allows for "app-to-app" communication scenarios. For example, files (individually or in batch mode) can be passed for opening, editing, processing, or other manipulations in one mobile application from another mobile application that accesses a cloud-based platform, service or other backend web services. Similarly, files that have been modified or manipulated in one mobile application can be passed to another mobile application that access a cloud-based platform, service or other backend web services for storage.

Various aspects of the cloud-based platform and the system and method for secure inter-application communication based on Intents will now be described. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

FIG. 1 illustrates an example diagram of a system having a host server of a cloud service and/or cloud storage accounts accessible via a mobile application facilitating inter-application communication over a secure channel based on Intents.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
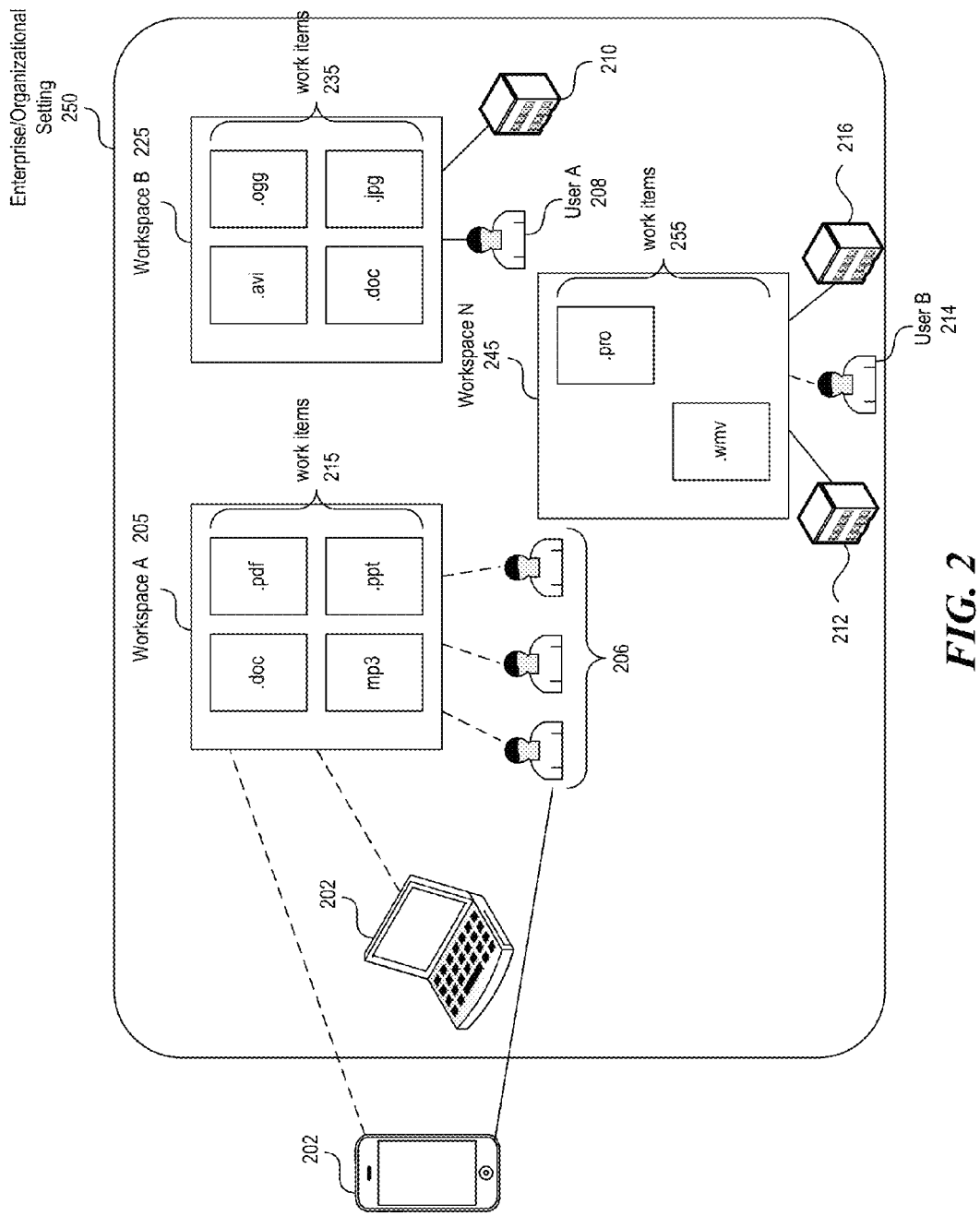
FIG. 2 depicts a diagram of a web-based or online collaboration platform deployed in an enterprise or other organizational setting for organizing work items and workspaces, as one example of a hosted cloud service and/or cloud storage accounts accessible via a mobile application facilitating inter-application communication over a secure channel based on Intents.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or web-based collaboration environment is able to track or monitor the devices used by users to access content or activities. In one implementation, such tracking or monitoring may be performed upon receiving explicit permission or authorization from users.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service accessible via a mobile application for facilitating inter-application communication over a secure channel based on Intents.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
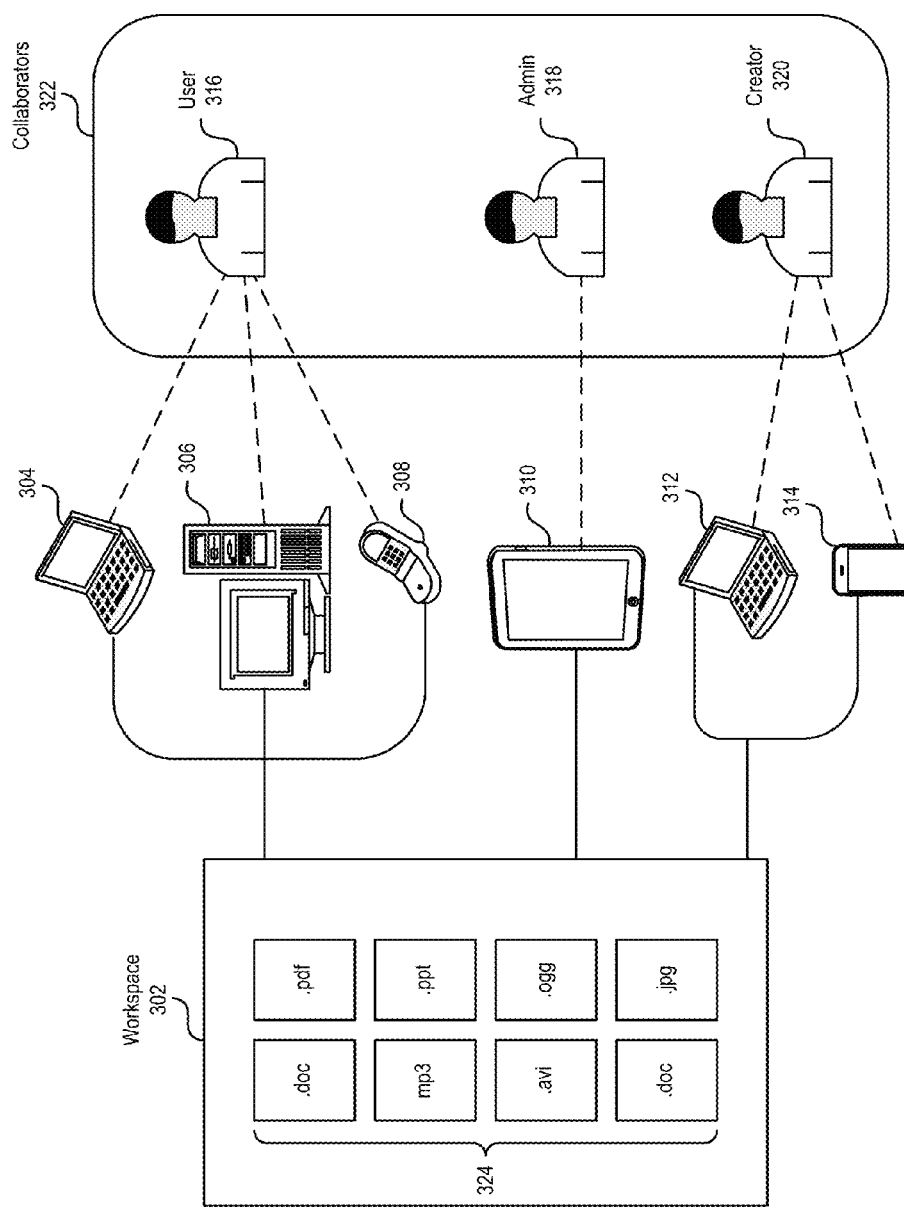
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 4:
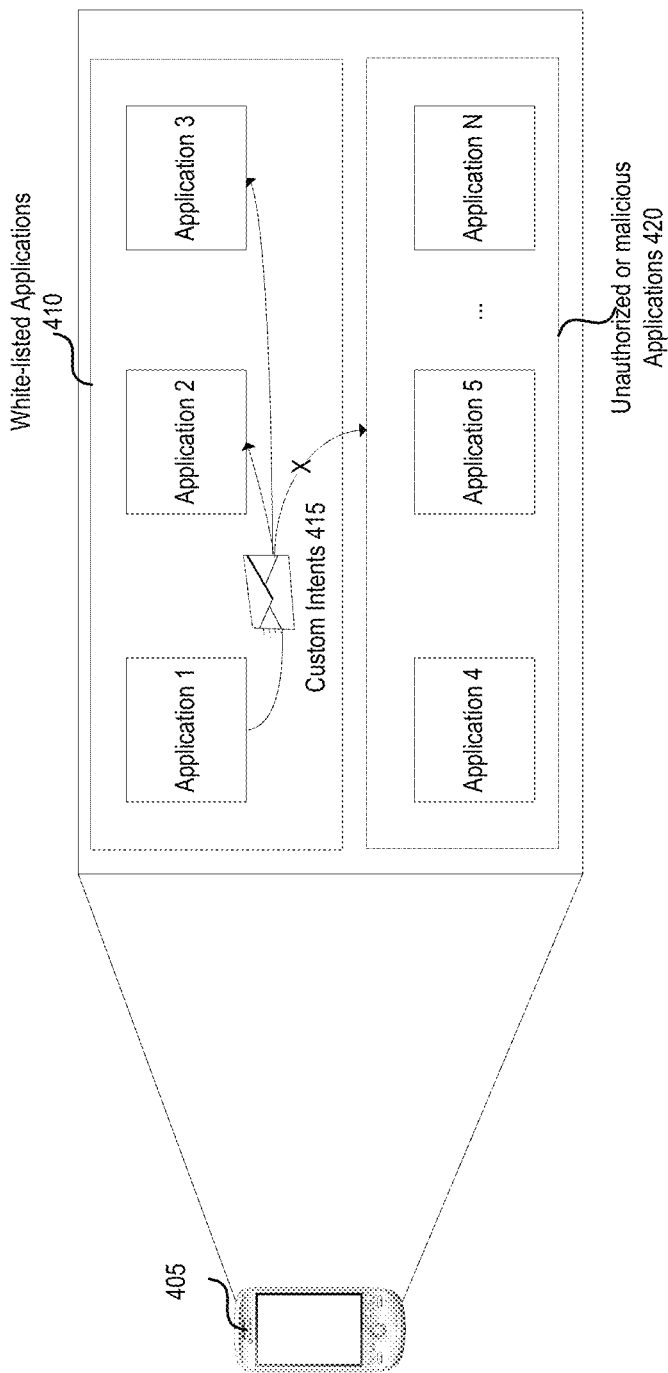
FIG. 4 depicts a block diagram illustrating an example inter-application communication via custom Intents.

FIG. 4 depicts a block diagram illustrating inter-application communication via custom Intents in one embodiment. A client device 405, based on the Android OS, can include a plurality of application such as Applications 1-N as illustrated. Some of the applications, such as Application 1-3 are designated as white-listed applications 410. The white-listed applications include those applications between which inter-application communication is allowed or authorized. For example, if Application 1 is a cloud-based collaboration platform application and Application 2 is a document editor application, then a document can be passed between the two applications for editing and/or uploading to a remote server.

Some of the other applications such as Applications 4-N are designated as unauthorized or malicious application 420. These applications are not be sanctioned for communication with a white-listed application. For example, some of these applications can, if given the opportunity, sniff, modify, steal or replace data being passed. By way of another example, some of these applications (e.g., gaming application) would have no reason to listen in on or have access to files from an application such as the collaboration platform application.

In one implementation, when Application 1 issues an Intent using the default Intent system, all applications 1-N, including the malicious and unauthorized applications, can detect the Intent, and have access to data being passed. However, when Application 1 issues a custom Intent 415, only the white-listed applications 410 can detect the custom Intent 415 and know how to respond to it. The unauthorized or malicious applications 420, on the other hand, would not know how to respond to the custom Intent, and would thus ignore the custom Intent.

Once a receiving application is identified or selected, a secure channel can be opened for communication between the sending application (e.g., Application 1) and the receiving application (e.g., Application 2 is selected) to allow transfer of data. In one implementation, the same channel or a new channel can be created for transferring modified or new data from the receiving application back to the sending application.

Figure 5:
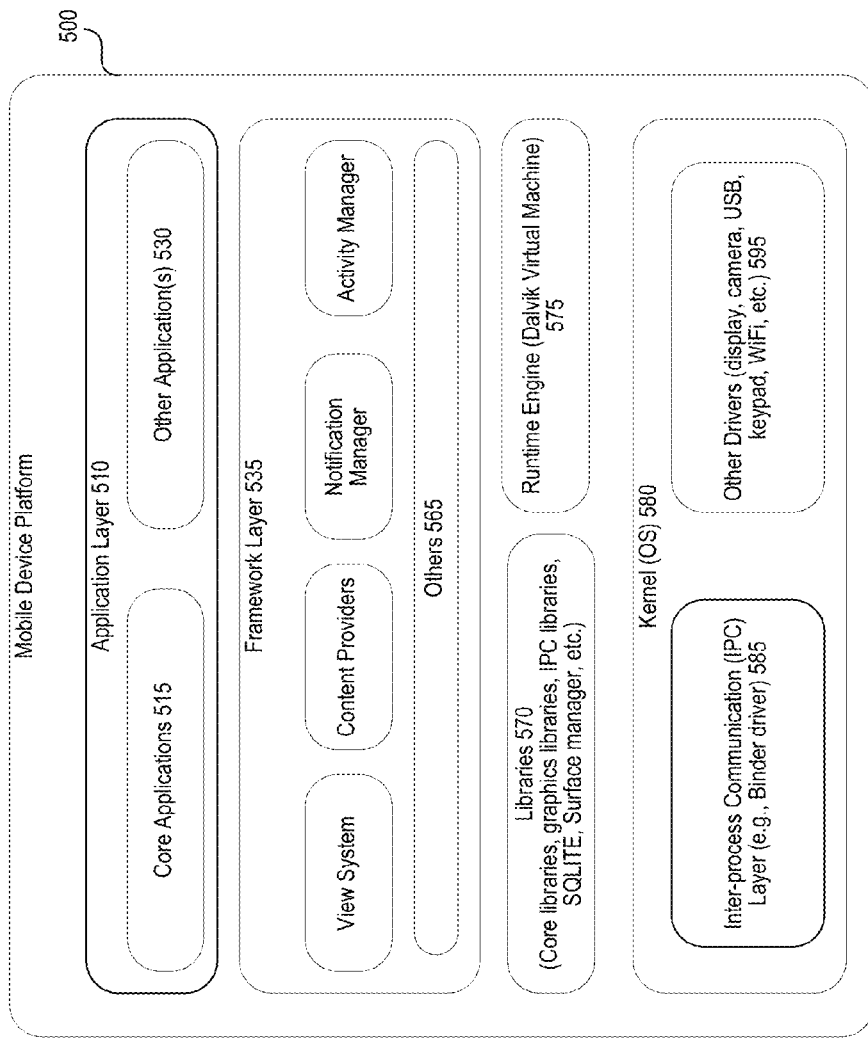
FIG. 5 depicts a block diagram of the architecture of a mobile device platform such as the Android Platform.

FIG. 5 depicts a block diagram of the architecture 500 of a mobile device platform such as the Android Platform. The mobile device platform includes an application layer 510, a framework layer 535, libraries 570, runtime engine 575 and a kernel 580. The application layer 510 includes native or core applications 515 and other applications 530 which can include, for example, the cloud-based collaboration platform application, white-listed applications, unauthorized or malicious application, and the like. The core applications 515 includes a set of applications such as email, SMS, calendar, maps, browsers, camera, alarm, media player, clock, voice dial, contacts, calculator, and the like.

The framework layer 535 includes framework application programming interfaces (APIs) that are used by the core applications, but can also be used in applications to take advantage of the mobile device hardware, access location information, store data in internal or external storage on the mobile device, run background services, add notifications (e.g., to the status bar), and the like. All applications are supported by a set of services and systems. For example, the view system can be used to build application user interface elements such as lists, text boxes, buttons, and the like. Content providers allow applications to access data from other applications or share their own data. A resource manager provides access to non-code resources such as localized strings, graphics, and layout files. A notification manager enables applications to display custom alerts in the status bar. An activity manager manages the lifecycle of applications and provides common navigation elements. The framework layer 535 may include additional components 565 that have not been specifically described.

A set of core and other libraries 570 are used by various components of the mobile device platform and provides many of the functionality. Example core libraries include media libraries that support playback and recording of audio/video and images, surface manager that manages access to the display subsystem and seamlessly compounds 2D and 3D graphic layers from multiple applications, a web browser engine that powers browsers and an embeddable web view (e.g., LibWebCore), 3D libraries (e.g., OpenGL ES 1.0 APIs), libraries for bitmap and vector font rendering, SQLite which is a powerful and lightweight relational database engine available to all applications, system C library, and the like.

Each mobile application can run in its own process with its own instance of the Virtual Machine 575 such as the Dalvik VM 575. The Dalvik VM, for example, executes files in the Dalvik Executable (.dex) format which is optimized for minimal memory footprint. The OS or the kernel 580 is the Linux kernel that acts as an abstraction layer between the hardware and the rest of the stack including the application layer 510, the framework layer 535, the libraries 570 and the virtual machine 575. The kernel supports core system services such as memory and process management, network stack, driver model and security. The kernel includes drivers 595 for display, camera, USB, keypad, Wi-Fi, and the like, and an inter-process communication (IPC) layer 585 that includes a binder driver to provide an IPC mechanism to facilitate communication (e.g., exchange of data) between processes within an application (intra-application communication) and between applications (inter-application communication). The IPC mechanism includes the Intent mechanism, using which the IPC layer 585 sends Intents to communicate data. The IPC layer, via the Intent mechanism, can start an activity, bring another activity to the front, start or stop a service, query and obtain results from a content provider (e.g., a data storehouse), deliver Intents to broadcast receivers, and the like.

Figure 6:
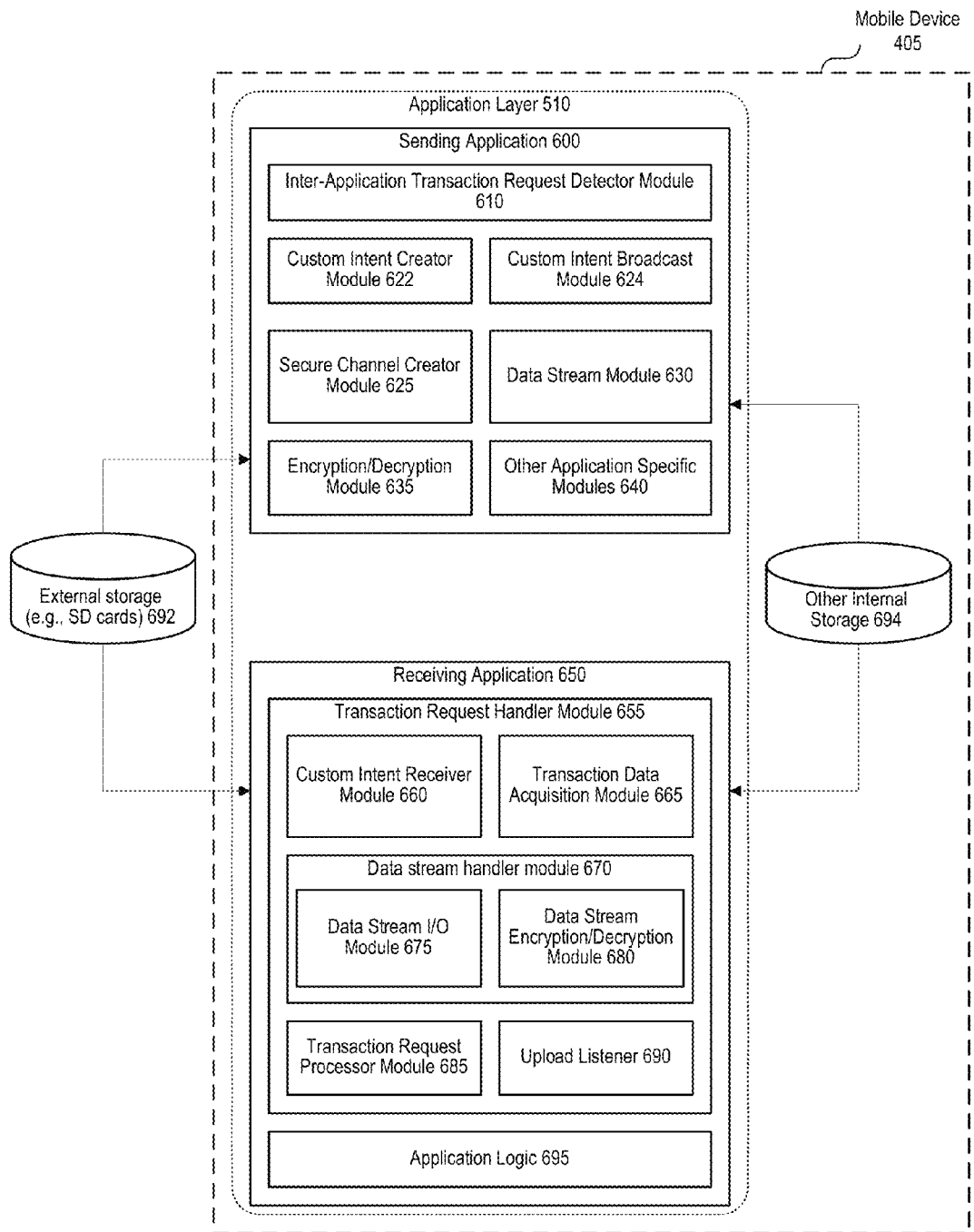
FIG. 6 depicts example of components of mobile applications, including a sending application and a receiving application, in a mobile device.

FIG. 6 depicts example of components in mobile applications, including a sending application 600 and a receiving application 650, that reside within the application layer 510 of the mobile platform 500 of the mobile device 405.

In one embodiment, the sending application 600 is a cloud-based collaboration platform application stored in the memory of the mobile device 405. In a further embodiment, the sending application 600 includes components that facilitate inter-application communication such as, but not limited to: an inter-application transaction request detector module 610, a custom Intent module 620, a secure channel creator module 625, a data stream module 630 and an encryption/decryption module 635. In addition to the secure inter-application communication specific components 610-635, other application specific modules 640 may be included in the application. The other application specific modules 640, such as but not limited to: a user interface module, application logic engines, upload/download managers, notification engines, and the like perform the various functions of the sending application.

The inter-application transaction request detector module 610 detects transaction requests initiated by a user of the mobile device. For example, a user can select a document from a user interface of the sending application 600 to open the document in another mobile application (i.e., receiving application). The user request to open the document can be detected and identified as an inter-application transaction request by the detector module 610. The detector module 610 can then notify or trigger the custom Intent module 620.

The custom Intent module 620 can include the custom Intent creator module 622 and the custom Intent broadcast module 624. The custom Intent creator module 622 can create a custom Intent. The custom Intent can be an implicit Intent in one implementation. An implicit Intent requests delivery of the message to any application that supports the desired operation requested in the message. Other types of Intents that are supported by the Android OS are explicit Intents and system broadcast Intents. Explicit Intents are delivered to a particular application specified by the Intent, while system broadcast Intents are system wide event notifications sent by the OS. Intents, in general, can trigger activities, services and broadcast receivers to perform an action. The custom Intent may be created to request a receiving application to perform a specific action. In some implementations, the custom Intent can include data or other extras. A custom action is different from other general actions such as ACTION_VIEW, ACTION_EDIT, ACTION_MAIN, etc., that are defined in the Android API and thus can be understood by all applications. A custom action, on the other hand, can be understood by those applications that recognize the request and know how to respond to the request.

The custom Intent from the custom Intent creator module 622 can request a receiving application to perform custom actions, including, but not limited to: modify an existing file, create a new file, upload the new file, open and show contents of a file, launch application, and the like.

The custom Intent broadcast module 624 can broadcast the created custom Intent to all applications, including white-listed and unauthorized applications. The broadcasting may be achieved by using the send broadcast method provided by the Android API.

The secure channel creator module 625 can create a secure channel between the sending application 600 and a receiving application. The secure channel creator module 625 allocates an area on the device's storage as a staging area for data to be passed between the sending and receiving applications. The storage area can be an internal storage area 694 that can be accessed by both sending and receiving applications. Alternately, the storage area can be an external storage area 692 such as an SD card. The storage area is effectively the channel between the applications. The channel is secure since only the sending and receiving applications have access to it. Furthermore, the files that go into the storage area are encrypted, providing an added layer of security.

In one implementation, files that are passed between applications may be sent as whole files. In an alternate implementation, the files may be sent as data stream to obfuscate the inter-application communication. The data stream module 630 includes methods for opening input and output streams to read and write data. The data stream module 630 can also automatically encrypt the data streams for passage through the secure channel between the sending and receiving applications.

The data stream module 630, in one implementation, can leverage the encryption/decryption module 635 to encrypt (or decrypt) data stream using various encryption methods. In one implementation, advanced encryption standard (AES)

with a key size of 128, 192 or 256 bits can be used to encrypt the data stream. The key for the encryption/decryption can be generated from a hash of an auth token or auth token with time stamp, for example. The auth token and time stamp information can be obtained from the internal storage in one implementation. In an alternate implementation, the auth token and time stamp may be obtained from the host server 100. For example, in one implementation, the encryption/decryption module 635 (or another module such as module 610) can start a background service that establishes a communication session with the host server 100 (or an authentication server) to obtain a newly generated key. In one implementation, the key may be unique to each transaction. In an alternate implementation, the key may be unique to transactions with a specific receiving application. In yet another implementation, the key may be unique to a session with the sending application. Further details regarding generation and/or acquisition of auth token or encryption keys may be found in co-pending US Patent Application entitled "Systems and Methods For Secure File Portability Between Mobile Application" which is hereby incorporated by reference in its entirety. Any appropriate hash function such as MD5, SHA-1/2/3, and the like can be used to generate the hash value for encrypting (and decrypting) data streams. Other symmetric or asymmetric encryption/decryption methods can be implemented in other embodiments. The hash value is passed on to the receiving application 650 as a key for decryption.

The receiving application 650 is a white-listed application including one or more application components or modules for facilitating secure inter-application communication. The receiving application 650 can include, for example, a transaction request handler module 655 having a custom Intent receiver module 660 and a transaction data acquisition module 665. The transaction request handler module 655 can also include other components such as a data stream handler module 670, a transaction request processor module 685, an upload listener 690 and an application logic 695 among others.

The transaction request handler module 655 can handle the transaction requests from the sending application. The custom Intent receiver module 660 can detect or receive the custom Intents broadcasted by the sending application via the IPC. The custom Intent receiver module 660 is registered with the OS, to inform the OS that the receiving application 650 can handle the custom Intent. In one implementation, the custom Intent receiver module 660 can start an activity that can translate the encoded message or custom Intent received into callbacks The callback methods can be implemented by the transaction request processor module 685 to respond to the requests from the sending application. Example callback methods may be implemented to respond to a request to: modify an existing file, upload the modified file as a new file or a new version, create a new file, upload the new file, open and show contents of a file, launch application, and the like. The call back methods can, depending on the request, load the appropriate user interfaces for the user to perform the requested action. For example, if the callback method is responsive to an encoded request to edit a file, the call back method can include program code or logic to load the user interface for the user to modify the file in the receiving application. Similarly, if the encoded message is a request to view a file, the transaction request processor module 685 can respond to the request by calling a method (e.g., onViewFileRequested(argument)) which in turn can load a read-only user interface for the user to view the file in the receiving application.

The transaction data acquisition module 665 can acquire data relating to the transaction request being processed. Example data that can be obtained can include file name, size, mime type (e.g., image files, text files, etc.), other meta data, and the like. The data stream handler module 670 opens input and output data streams to read and write files via the secure channel. In one implementation, the data stream I/O module 675 implements a method to get an input stream to a file ((i.e., a secure channel), to for example, show the contents of the file to a user. In a further implementation, the data stream I/O module 675 implements a method to get an output stream to write new data to a file (i.e., a secure channel), for example. In one implementation, the input and output streams automatically encrypt/decrypt data using any of the encryption methods implemented by the data stream encryption/decryption module 680. The data stream encryption/decryption module 680 can receive hash of one or more pieces of information such as auth token, time stamp, and the like as a key for decrypting the file in transit. One embodiment of the receiving application can include an upload listener 690. The upload listener can monitor the upload of one or more files to the sending application, for example. The progress information can be used to display a user interface element such as a progress bar or a status bar on the client device.

The application logic 695 includes logic for processing user requests such as requests to view, save, modify, upload, etc., one or more files. The application logic 695 can also process edits, deletions, modifications and any other operations performed on a file. The application logic may be specific to each receiving application. For example, a "DocuSign" application can include logic for adding digital e-signature on documents, while "GoodNotes" application can include logic for adding notes, marking documents, and the like. Other application specific modules may be present in the receiving application 650 in some implementations.

Figure 7:
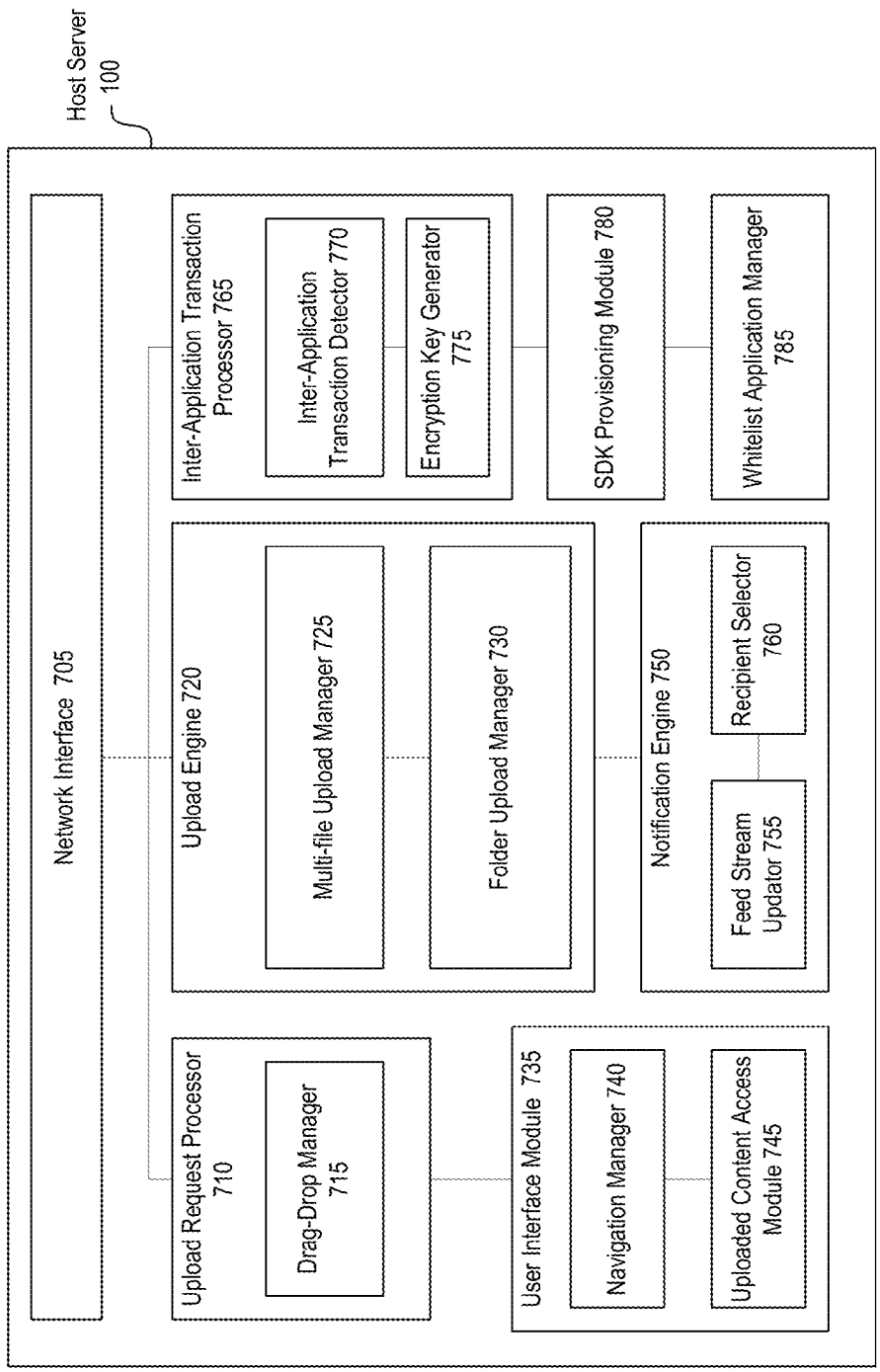
FIG. 7 depicts a block diagram illustrating an example of components in a host server for cloud-based services and storage accounts accessible via a sending application in a mobile device.

FIG. 7 depicts a block diagram illustrating an example of components in a host server 100 for cloud-based services and storage accounts accessible via a sending application on a mobile device.

The host server 100 of the web-based or online collaboration environment can generally be a cloud-based service. The host server 100 can include, for example, a network interface 705, an upload request processor 710 having a drag-drop manager 715, an upload engine 720 having a multi-file upload manager 725 and/or a folder upload manager 730 and a user interface module 735 having a navigation manager 740 and an upload content access module 745. The host server 100 can also include, for example, an inter-application transaction processor 765 having an inter-application transaction detector 770 and an encryption key generator 775. One embodiment of the host server 100 can also include an SDK provisioning module 780 and a white list manager 785. Another embodiment of the host server 100 further includes a notification engine 750 having, for example, a feed stream updator 755 and/or a recipient selector 760. Additional or less components/modules/engines can be included in the host server 100 and each illustrated component.

The network interface 705 can be a networking module that enables the host server 100 to mediate data in a network with an entity that is external to the host server 100, through any known and/or convenient communications protocol supported by the host and the external entity. The network interface 705 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

One embodiment of the host server 100 includes the upload request processor 710 which can receive, detect, process, identify, parse, translate, and/or determine an activity request. An upload request can be submitted by a user through a user interface of the collaboration platform to upload one or multiple items.

The user can identify the files, content, or work items to be uploaded to the host server 100 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 715.

In one embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 720 can upload the requested item or multiple requested items. The upload engine 720 can, in one embodiment, upload a single item or multiple items (e.g., sequentially or simultaneously) to the host server 100. A multiple item upload may be initiated via a single-step or multi-step user request. A multi-file upload request can be handled, processed, and executed, for example, through the multi-file upload manager 725.

In one embodiment, the multi-file upload manager 725 receives an identification of each of the multiple files to be uploaded (e.g., from the upload request processor 710) and sequentially prepares each individual file for uploading and uploads each file independently. For example, the upload manager 725 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 720 uploads multiple items in a folder hierarchy based on a single request to upload a folder which has a hierarchy of folders inside, for example, via the folder upload manager 730. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 730 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 100 includes a notification engine 750. The notification engine 750, can for example, update a feed stream to include an updated feed indicate that an item or multiple items have been uploaded, for example, via the feed stream updator 755. The users that are notified can be selected, for example, by the recipient selector 760, and can include collaborators or the user, or other users meeting a criterion. In some instances, the feed stream is updated in real time or near real time relative to when the upload of the item completed. For real-time updating, the notification engine 750 can utilize another server, or another engine in the same server which provides push functionality.

The notification engine 750 can generally notify users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 750 can utilize a push-enabled service to ensure real time notification. In one embodiment, the notification is sent by a component or another server which implements push technology (e.g., the notification server 150 shown in the example of FIG. 1). The push-enabled service can be implemented via long poll or HTTP streaming, for example, by the notification server 150 or another component, device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

One embodiment of the host server 100 includes the user interface module 735, which preserves or enhances user experience before, during, or after an upload request. For example, the user interface module 735 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 740 in the user interface module 735. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between pages during an upload of multiple files can also be managed by the navigation manager 740. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 745, for example. Thus, during an active upload, individual files which have completed uploading can be accessed or interacted with by the user in the collaborative environment without having to wait for the full upload to complete.

In some instances, the item which has been uploaded to the host server is manipulatable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

One embodiment of the host server 100 can include an SDK provisioning module 780 and a whitelist application manager 785. The SDK provisioning module 780 can provision SDKs, API keys/tokens, and the like to applications that have been approved for integration with the sending application. The SDK can include certain methods, iconography, and the like that allow inter-application communication and make the inter-application communication capability apparent to users of both applications. For example, the SDK can recognize encoded messages broadcast by the sending application (e.g., the cloud-based collaboration platform application) and include response to method calls to facilitate various data access and transfer scenarios discussed above.

Applications that have integrated with the sending application by implementing the SDK, can be designated as a whitelisted application by the whitelist application manager 785. The whitelisted applications can receive automatic notifications of updates to SDKs, can make API calls to the host server, receive and respond to custom Intents, and the like.

In one embodiment of the host server 100, the inter-application transaction processor 765 can include an inter-application transaction detector 770 and an encryption key generator 775. The inter-application transaction detector 770 can detect an inter-application transaction request from the sending application and/or the receiving application. The transaction request may or may not involve file transfer. For example, if the transaction request is for the launch of the receiving application, no file transfer is involved. The inter-application transaction processor 765 may not take any further steps where no file transfer between applications is involved. However, if the transaction request is to open a file in the receiving application, the inter-application transaction detector 770 may detect it as such, and trigger the encryption key generator to generate an encryption key for encrypting/decrypting the file in transit. In one implementation, the inter-application transaction detector 770 can detect the transaction request based on the encryption key request from the sending application. In one implementation, the inter-application transaction detector 770 can also determine whether a transaction request requires a new encryption key and if so, can trigger the encryption key generator 775 to generate and send a new encryption key. For example, in one implementation, each transaction request involving a file transfer may require a new encryption key. In another implementation, a new encryption key may be required for the first transaction, and the next few transactions may not require a new key. In other implementations, a new encryption may be required for each new session with the requesting application, after expiration of a predefined time period, for each receiving application involved in a transaction, and the like.

In one embodiment, the encryption key generator 775 can generate and send to the requesting application an encryption key for encryption one or more files. In one implementation, the encryption key may have an associated time stamp which can be used to determine the expiration date/time. The encryption key, in one implementation, can be an auth token, a hash of an auth token with or without a time stamp, and the like.

Figure 8:
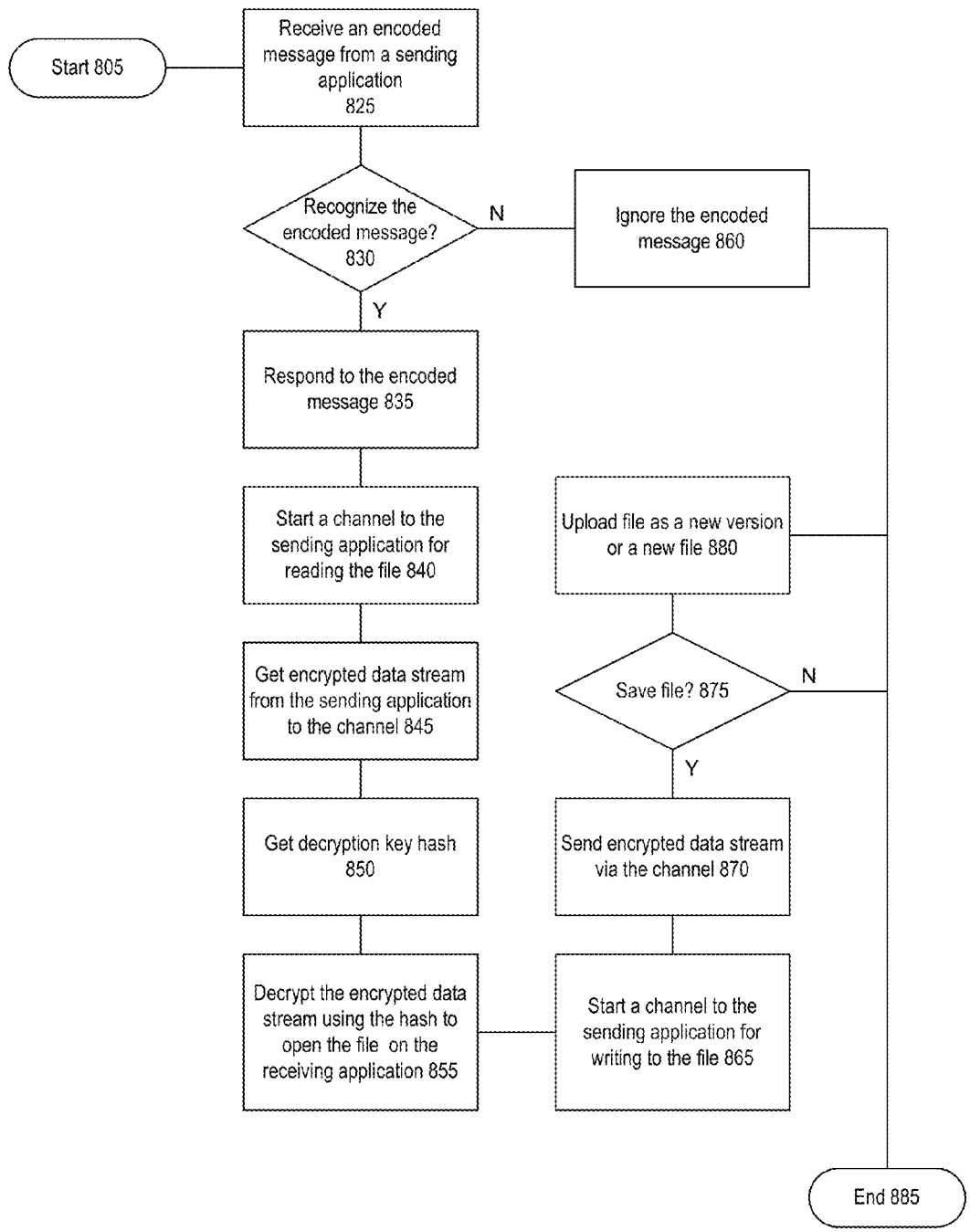
FIG. 8 depicts a logic flow diagram of an example inter-application communication over a secure channel started by a custom Intent.

FIG. 8 depicts a logic flow diagram of an example inter-application communication over a secure channel started by a custom Intent. In one implementation, the sending application detects a user request to open and edit a file. The user request can be related to a file, multiple files, or folders. The user request can be to open, view, edit, modify or process, print, email, or perform any other actions on the file using a receiving application. In one implementation, the file can be opened and/or edited in one or more applications including the receiving application. For example, a document can be electronically signed using "DocuSign" or "Sign Easy" or others.

In one implementation, the sending application can create a custom Intent and broadcast the custom Intent to all applications capable of opening and editing a file. The custom Intent can be an encoded message including the user request. Starting at block 805, a receiving application receives a custom Intent at block 825. In order to receive the custom Intent, the receiver component of the receiving application can register itself with the OS via a configuration file such as the Android Manifest file.

At decision block 830, if the receiving application cannot recognize the custom Intent, the receiving application would not know how to respond to the custom Intent, and ignores the custom Intent at block 860. If, however, the receiving application can recognize the custom Intent, the receiving application responds to the custom Intent at block 835. In one implementation, the response may include loading of the user interface associated with the user request. For example, the receiving application can load the user interface for the user to edit the file. In one implementation, the receiving application can also get additional information on the file associated with the request from the sending application. The additional information can include, but is not limited to: file name, file size, mime type, and any other file metadata.

At block 840, the receiving application starts a channel for communication with the sending application. Via the channel, the receiving application gets encrypted data stream of the file associated with the user request at block 845. The data stream going into the channel can be encrypted using an encryption key. The encryption key can be generated from a hash of auth token and/or time stamp in one implementation. The receiving application gets the decryption key hash from the sending application or directly from the host server 100 at block 850. At block 855, using the hash, the receiving application decrypts the data stream to open the file on the receiving application for editing by the user.

When the file is open, the user can make any changes, and save the changed file as a new version or a new file, in one implementation. At block 865, the receiving application starts a channel to the sending application for writing to the file. In one implementation, the channel can be a memory area or a buffer where data can be read from or written to. At block 870, the receiving application sends encrypted data stream to the channel between the sending and receiving applications. In one implementation, the changes can be encrypted and sent to the channel as they are being input by the user. In another implementation, the changes can be held by the receiving application and encrypted and sent to the channel intermittently or when the user saves the changes, closes the file, and the like. At decision block 875, if the user saves the file, the receiving application uploads the file as a new version or create a new file at block 880. In one implementation, the methods executed by the receiving application for uploading the file as a new version or a new file takes the file data and changes from the channel to create the new version or new file. If the user decides to abandon the changes at decision block 875, the process ends at block 885.

Figure 9:
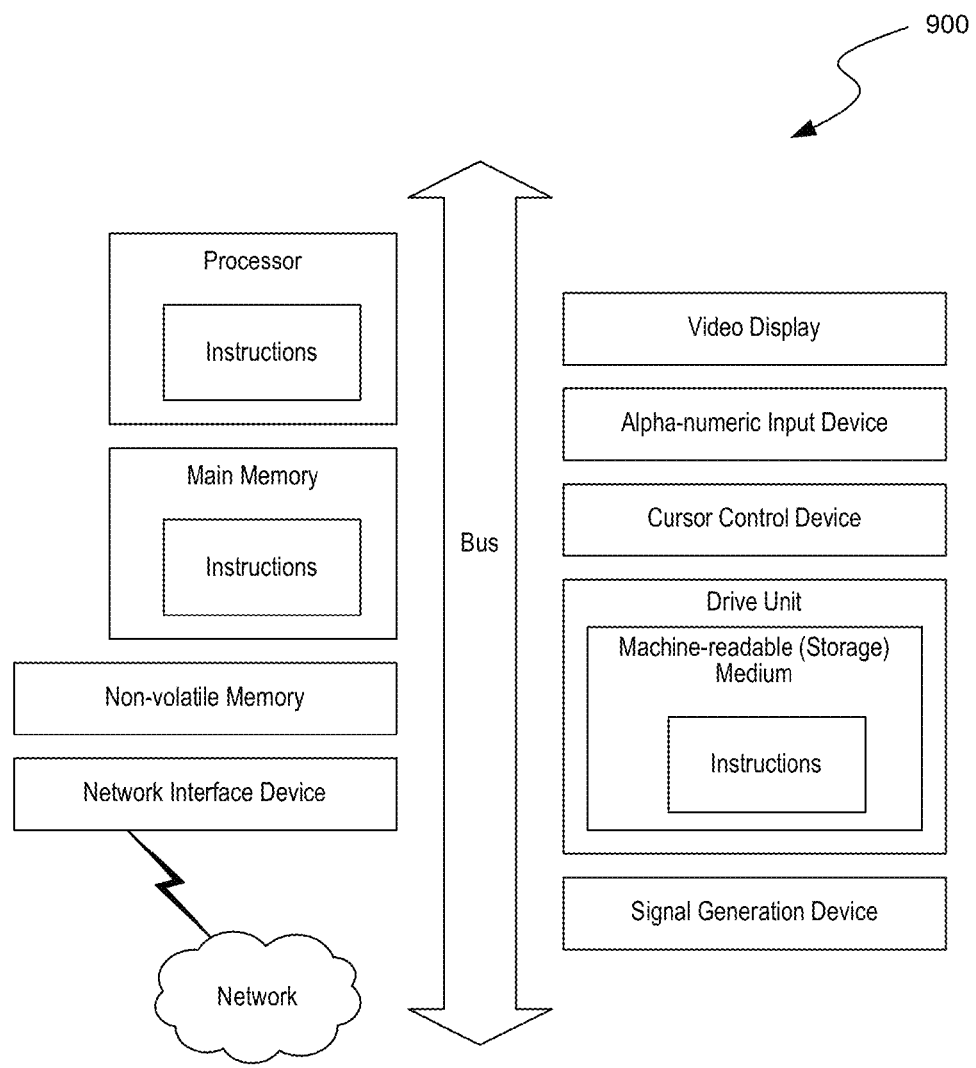
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The invention claimed is:

1. A method of providing a channel for securely transferring data between applications on a mobile device, the method comprising:
    detecting one or more qualified applications on the mobile device that are qualified to interact with a cloud communication application on the mobile device, wherein the cloud communication application provides access to a cloud-based platform providing file storage and collaboration services;
    providing a channel for communication between the cloud communication application and at least one qualified application of the one or more qualified applications,
    wherein providing the channel includes establishing a secure storage area on the mobile device that is inaccessible by the applications on the mobile device with the exception of the cloud communication application and the one or more qualified applications,
    wherein any data transferred via the channel is encrypted, and
    wherein the at least one qualified application is selected from the one or more qualified applications to receive a file based on user input;
    transferring, from the cloud communication application to the at least one qualified application, the file in encrypted form via the channel, wherein the cloud communication application receives the file from the cloud-based platform providing file storage and collaboration services;
    allowing subsequent manipulation of the transferred file by the at least one qualified application;
    receiving, by the cloud communication application, a new version of the file from the at least one qualified application via the channel; and
    uploading, by the cloud communication application, the new version of the file to the cloud-based platform providing file storage and collaboration services.

2. The method of claim 1, further comprising:
    triggering, by the cloud communication application, a broadcast of an encoded message to the applications on the mobile device for detecting the one or more qualified applications.

3. The method of claim 2, wherein the one or more qualified applications are configured to receive the broadcast.

4. The method of claim 2, further comprising:
receiving, from the one or more qualified applications, a response to the encoded message, wherein the encoded message is decoded at the one or more qualified applications.

5. The method of claim 1, wherein the secure storage area is an internal storage area on the mobile device.

6. The method of claim 1, wherein the secure storage area is an external storage area on the mobile device.

7. The method of claim 1, wherein the file that is transferred in encrypted form from the cloud communication application to the receiving application is encrypted using an encryption key that is specific to the receiving application, wherein the encryption key is usable for encrypting files that are subsequently transferred from the cloud communication application to the receiving application.

8. The method of claim 1, wherein the file that is transferred in encrypted form from the cloud communication application to the receiving application is encrypted using an encryption key that is specific to each transaction with the receiving application, wherein the transfer of the file from the cloud communication application to the receiving application via the channel comprises a transaction with the receiving application.

9. A system for providing a secure channel for transferring data between applications on a mobile device, the system comprising:
a processor; and
a memory unit having instructions stored thereon which when executed by the processor, causes the processor to:
trigger, by a cloud communication application, a broadcast of an encoded message to multiple applications on the mobile device to detect one or more authorized applications;
select an authorized application from the one or more authorized applications;
open, by the cloud communication application, the secure channel for communication with the authorized application on the mobile device; and
transfer, by the cloud communication application, a file in encrypted form to the authorized application via the secure channel on the mobile device, wherein the file is downloaded from a cloud-based server associated with the cloud communication application and wherein the file is subsequently manipulated using the authorized application;
receive, by the cloud communication application from the authorized application via the secure channel, a new version of the file; and
upload, by the cloud communication application, the new version of the file to the cloud-based server,
wherein the secure channel is established by allocating a secure storage area on the mobile device that is inaccessible by the applications on the mobile device with the exception of the cloud communication application and the one or more authorized applications, and
wherein any data transferred via the channel is encrypted.

10. The system of claim 9, wherein the cloud-based server provides a collaboration or file sharing service.

11. The system of claim 9, wherein the authorized application recognizes the encoded message.

12. A non-transitory computer-readable medium storing instructions, which when executed by one or more processors of a computing system, causes the computing system to:
trigger a broadcast of an encoded message to applications on the computing system;
detect one or more authorized applications that recognize and respond to the encoded message;
receive a selection of an authorized application from the one or more authorized applications;
open, by a cloud communication application, a secure channel for communication with the authorized application on the computing system;
receive, by the cloud communication application, one or more files from a cloud-based server providing storage and collaboration services;
transfer, by the cloud communication application, the one or more files in encrypted form to the authorized application via the secure channel to enable the authorized application to manipulate the one or more files;
receive, by the cloud communication application, a new version of the one or more files from the authorized application via the channel, the new version of the one or more files including changes made by a user to the one or more files using the authorized application; and
upload, by the cloud communication application, the new version of the one or more files to the cloud server providing file storage and collaboration services,
wherein the secure channel is established by allocating a secure storage area on the computing device that is inaccessible by the applications on the computing system with the exception of the cloud communication application and the one or more authorized applications, and
wherein any data transferred via the channel is encrypted.

13. The computer-readable medium of claim 12, wherein the broadcast is triggered by the cloud communication application.

14. The computer-readable medium of claim 12, wherein the one or more files that are transferred to the authorized application via the secure channel in encrypted form are encrypted using an encryption key that is specific to the authorized application, and wherein the encryption key is usable for encrypting files that are subsequently transferred to the authorized application.

15. The computer-readable medium of claim 12, wherein the one or more files that are transferred to the authorized application via the secure channel in encrypted form are encrypted using an encryption key that is specific to each transaction with the authorized application, and wherein transferring of the one or more files to the authorized application comprises a transaction.

16. A mobile device implementing a secure channel for transferring one or more files between mobile applications on the mobile device, comprising:
one or more processors;
a memory unit having instructions stored thereon, which when executed by the one or more processors, causes the mobile device to:
detect one or more receiving applications qualified to interact with a cloud communication application, wherein the cloud communication application provides access to a cloud-based platform server;
provide the secure channel for communication between the cloud communication application and a selected receiving application from the detected one or more receiving applications on the mobile device; and
transfer, from the cloud communication application to the receiving application, the one or more files in encrypted form via the secure channel, wherein the one or more files are received by the cloud communication application from the cloud-based platform server; and allow the transferred one or more files to be subsequently decrypted and manipulated at the receiving application;

receive, by the cloud communication application, a new version of the one or more files in encrypted form from the receiving application via the secure channel; and uploading, by the cloud communication application, the new version of the one or more files to the cloud-based platform server, wherein providing the secure channel comprises the cloud communication application establishing a secure storage area on the mobile device that is inaccessible to the applications on the mobile device except the cloud communication application and the one or more receiving applications, and wherein any data transferred via the secure channel is encrypted.

17. The mobile device of claim 16, wherein the processor is further configured to broadcast a custom Intent to all applications on the mobile device for detecting the one or more receiving applications, wherein the mobile device is based on the Android operating system.

* * * * *